Patented Feb. 19, 1952

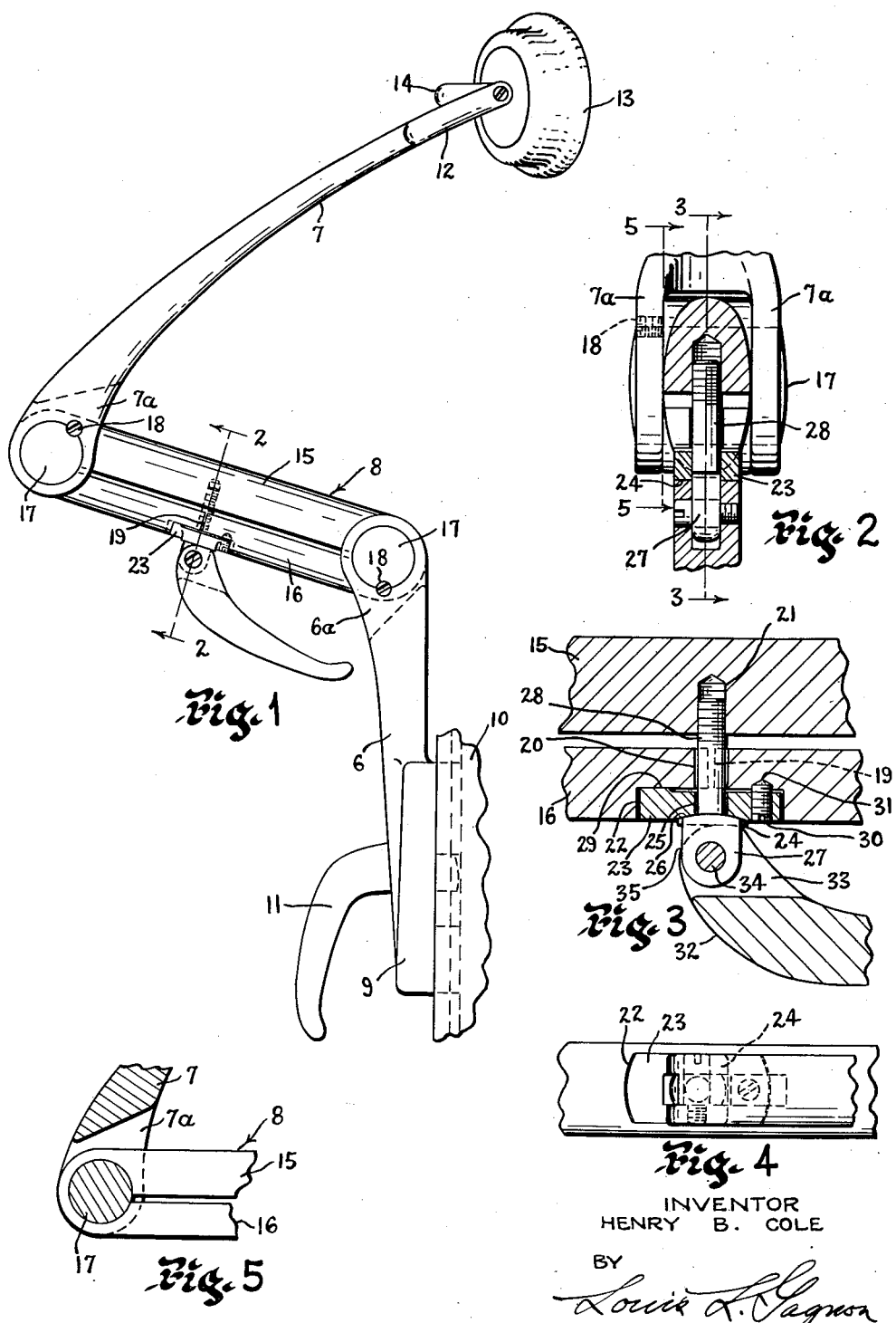

2,586,417

UNITED STATES PATENT OFFICE 2,586,417

CLAMPING DEVICE FOR ADJUSTABLE HEADRESTS

Henry B. Cole, East Woodstock, Conn., assignor to American Optical Company, Southbridge, Mass., a voluntary association of Massachusetts Application February 9, 1949, Serial No. 75,419

9 Claims. (Cl. 155—177)

This invention relates to head rests and has particular reference to adjustable head rests for chairs such as are used in the practice of optometry, denistry and the like.

The principal object of the invention is to provide a head rest for supporting the head of a person in a desired position of adjustment and embodying an improved clamping device whereby the parts of the head rest may be locked immovably in the adjusted position.

Another object is to provide an adjustable support for a head rest of the above character wherein a pair of members to be adjusted each has a bifurcated end with a shaft fixedly carried by each of said ends, said shafts extending transversely of the bifurcations, with a clamp arm having bearing portions adjacent its opposed ends lying within the respective bifurcations and through which the respective shafts are extended, said clamp arm carrying a clamping device which upon operation will cause the bearing portions to grip the shafts and retain the members in adjusted position.

Another object is to provide a head rest of the above character having an improved clamping device for retaining the head rest in adjusted position embodying a split arm connected at each end to adjacent parts of the device and a stud projecting through the split arm and carrying a bearing plate having a substantially flat surface thereon, an elongated handle secured to one end of the stud and having a cam surface adapted to engage the flat surface of the bearing plate to apply pressure upon the arm to render it immovable with respect to the adjacent parts of the device, and means for securing the stud and plate against rotation and to retain the handle in substantially parallel relation to the arm when the device is locked in adjusted position and for movement about an axis substantially parallel to the flat surface of the bearing plate.

Another object is to provide a head rest with a clamping device of the above character which device can be readily adjusted to accommodate for wear of the operative parts thereof and thereby retain the desired tension of the device.

Another object is to provide a head rest of the above character which is simple in its construction, readily assembled, efficient in its operation, and comparatively economical to manufacture.

Other objects and advantages of the invention will become apparent from the following description taken in connection with the accompanying drawing, in which:

Fig. 1 is a side elevational view of a head rest embodying the invention;

Fig. 2 is a fragmentary sectional view taken on the line 2—2 of Fig. 1 and looking in the direction of the arrows;

Fig. 3 is a fragmentary sectional view taken on line 3—3 of Fig. 2;

Fig. 4 is a fragmentary plan view of the clamping arrangement; and

Fig. 5 is a fragmentary sectional view taken on line 5—5 of Fig. 2.

For attaining maximum usefulness, a chair such as used in the practice of optometry, dentistry and other professions should have a head rest which can be adjusted through a wide range of positions to accommodate persons of all sizes and which, when adjusted, will retain its adjusted position. The prior art shows various means of attaining the desired adjustment such as by providing ball and socket type joints with means for clamping these joints to prevent movement of the related parts. However, many of these devices employ handles adapted to be operatively manipulated by the chair operator for locking the parts of the head rest in adjusted position with the handle, upon manipulation, sometimes projecting into the path of movement of the practitioner and possibly snagging upon clothing or appliances of the practitioner. This condition may result in loosening of the adjustment and thus require readjustment.

It is also possible, with many prior art constructions, for the operative parts to become loosened during use, consequently necessitating readjustment of the tension of the clamping device. This is particularly true of devices employing a bolt projecting through an opening in a clamp member and threaded into an adjacent clamp member, with a handle being attached to the free end of the bolt. With such devices the bolts are easily loosened during use.

These and other disadvantages are overcome by the present invention wherein a bearing plate is inserted between the head of a bolt and the adjacent clamp member and rotatable with the bolt, and the bearing plate is locked immovable when the desired tension adjustment is attained. This will also render the bolt immovable and thus retain the desired adjustment permanently or until readjustment is desired. By shaping the bolt head for comating engagement with the bearing plate and thus rendering the bolt immovable, a handle connected to the outer end of the bolt will thus be maintained in a desired position with respect to the clamp and prevented from moving or being moved to a position where it may project into the way of the practitioner.

Referring more particularly to the drawing wherein like characters of reference designate like parts throughout the several views, the invention is embodied in a head rest having a bracket arm 6 and a yoke arm 7 both of which are preferably formed of material of a substantially rigid nature and are connected for vertical adjustment with respect to one another by a clamping device 8. The bracket arm 6 is formed on a bracket 9 attached to the back of a chair 10 by suitable conventional means permitting vertical adjustment thereof upon manipulation of a handle 11 or the like. The yoke arm 7 carries at its free end a yoke 12 having head rest pads 13 pivotally attached to an adjustable supporting member 14 swivelly carried thereby.

The clamping device 8 embodies an elongated arm which is formed of metallic material having some degree of resiliency. The arm is provided with parallel transverse bores adjacent each end and split longitudinally between each of the openings to form a pair of adjacent spaced parallel portions 15 and 16 connected only at their extremities (Fig. 5). The ends of the yoke arm 7 and bracket arm 6 are shaped to have spaced pairs of bifurcations 7a and 6a respectively with the ends of the clamping device 8 being positioned between the respective bifurcations. Transverse openings are provided in the bifurcations 7a and 6a concentric with the openings adjacent the ends of the clamping device 8 and each has a horizontally disposed shaft 17 secured therein, a shaft 17 being adapted to rotatably reside within a respective opening in the arm 8 and locked for movement with the respective arm 6 or 7 by short threaded studs 18 (Figs. 1 and 2), each stud 18 being inserted in an opening provided therefor partially in the respective shaft 17 and partially within one of the bifurcations. Thus, the shafts 17 permit longitudinal movement of the arms 7 and 8 with respect to the fixed arm 6 about the arcs of the shafts 17.

The portion 16 of the clamping device 8 is split transversely to form a kerf 19 substantially midway thereof (Figs. 1 and 3) and has a vertical bore 20 therethrough centrally thereof (Fig. 3) through the kerf 19. A concentric threaded opening 21 is provided in the adjacent portion 17 of the clamping device 8. The outer surface of the portion 16 is provided with a flattened recessed area 22 of a contour size and shape to freely receive a bearing plate 23 therein, with the bearing plate being movable on the flat surface. The recess 22 is provided with curved ends having a predetermined radius from the center of the bore 20 and the ends of the bearing plate 23 are curved so that the plate 23 may rotate within the recess about the axis of the bore.

The bearing plate 23 has a flat raised portion 24 on its outer surface and an opening 25 therethrough concentric with the bore 20 in the arm portion 16. A longitudinal slot 26 is formed in the surface of the raised portion 24 and is shaped to receive the lower portion of the head 27 of a bolt 28 which is inserted through the openings 20 and 25. The bolt 28 is adapted to freely extend through the openings 20 and 25 and has a threaded portion adapted to threadedly engage the threaded hole 21 in the arm portion 15. Since the head 27 of the bolt 28 is resting in the groove 26 in the bearing plate 23, rotation of either the bolt or bearing plate will cause similar rotative movement of the other of said parts. Thus, it is apparent that the bolt 28 may be threaded into the threaded hole 21, with simultaneous rotation of the bearing plate 23, until the desired tension is attained in the device; that is, by tightening the bolt 28 the bearing plate will exert pressure upon the arm portion 16 adjacent the kerf 19 and will cause the portion 16 to flex toward the adjacent arm portion 15. This will cause consequent tightening of the ends of the clamp arm 8 around the horizontal shafts 17 and by performing this operation the major adjustment to provide the desired amount of tension can be made. However, since it is desired to maintain the side surfaces of the bolt head and the bearing plate substantially with the adjacent arm portion 16, this adjustment can be made only to a half turn of the bolt.

The inner surface of the bearing plate 23 is preferably provided with a horizontal raised portion 29 adjacent one end thereof. This will, when the raised portion 29 is seated properly upon the flat bottom surface of the recess 22, cause the opposite end of the bearing plate to be spaced slightly away from the bottom surface as shown in Fig. 3. A threaded opening is provided through the bearing plate adjacent the opposite end thereof and has mounted therein a threaded adjusting screw 30. The screw 30 is of a length to extend through the bearing plate 23 with its inner end being adapted to reside in a recess 31 provided therefor in the bottom of the recess 22. By turning the screw 30 in a clockwise or counterclockwise direction the end of the bearing plate 23 carrying the screw 30 can be moved toward or away from the bottom surface of the recess 22. This will provide for final adjustment of the tension and supplements the major adjustment provided by rotating the bolt 28 and bearing plate 23. Due to the tension previously introduced in the device by the initial adjustment of the bolt 28 the end of the screw 30 will always be in contact with the recess 31, which condition is essential for efficient functioning of the final adjustment. This adjustment also provides means for adjusting for wear of the operative parts of the device.

In addition to this function the adjusting screw performs the second function of preventing the bearing plate 23 and bolt 28 from rotation. Thus, the major tension adjustment will be maintained as adjusted until the screw 30 is removed to permit the bolt and bearing plate to be rotated for readjustment of the device.

It is important to note that the bolt head 27 is mounted upon the bearing plate 23 so that when the adjusting screw 30 is in place the side surfaces of the head extend substantially parallel with the arm 8. To perform the actual clamping operation to render the arms 6 and 7 in adjusted position, a handle 32 is provided. The inner end of the handle 32 is grooved longitudinally to form spaced ears 33 which are adapted to overlap opposed side surfaces of the bolt head 27 and to be rotatable thereover on a shaft 34 extending transversely through the head 27 and ears 33. The handle thus is positioned to extend longitudinally of the clamping arm 8. The end portions of the handle ears 33 are shaped to have cam surfaces 35 adapted to engage the raised portion 24 of the bearing plate 23 on either side of the bolt head 27. Thus, when the handle is pressed toward the arm 8 the high points on the cam surfaces 35 will engage the raised portion 24 of the bearing plate 23, forcing inwardly the arm portion 16 adjacent the kerf 19 which will consequently cause considerable clamping action of the ends of the arm 8 upon the shafts 17. To release the device to permit readjustment of the head rest, the operator will rotate the handle away from the arm 8 and about shaft 34, which will move the high points of the cam surfaces off the bearing plate 23, thus relieving the pressure on the shafts 17.

From the foregoing it will be understood that there is provided an improved head rest for adjustable chairs or the like wherein an improved clamping device permits the parts of the head rest to be adjusted as desired and prevents accidental or other undesirable movement of the adjusted parts until the clamping device is intentionally operated to permit movement thereof.

It will be apparent that various changes may be made in the details of construction and arrangement of parts shown and described without departing from the spirit of the invention as expressed in the accompanying claims, and it is, therefore, to be understood that all matter set forth herein or shown in the accompanying drawing is to be interpreted as illustrative and not in a limiting sense.

I claim:

1. An adjustable support for a head rest comprising a pair of members each having bifurcated ends with a shaft fixedly carried by each of said ends and extending transversely of the bifurcations, a clamp arm having bearing portions adjacent its opposed ends lying within the respective bifurcations and through which the respective shafts are extended, said clamp arm having a slot extending longitudinally thereof and communicating with the respective bearing portions so as to produce spaced intermediate portions with one of said portions being movable toward the other and having an opening therethrough, a connecting member extending freely through said opening and having a portion adjustably secured to the other of said intermediate portions, a bearing plate located over the free end of said connecting member and movable therewith, a clamp member pivotally carried by the free end of said connecting member and having a portion engaging the bearing plate, said clamp member further having a handle portion extending longitudinally of the spaced intermediate portions which when moved in one direction will cause said clamp member to bear upon the bearing plate to move the adjacent intermediate portion toward the other thereof to cause said respective bearing portions to frictionally grip the shafts and when moved in the opposite direction will release said frictional grip of said bearings, and adjusting means for adjustably positioning the bearing plate against the adjacent intermediate portion and holding said clamp member and handle portion against sidewise displacement during movement thereof about the pivot.

2. A head rest comprising the combination of a pair of adjustable members each having a shaft fixedly carried thereby, and a clamping device for immobilizing said members after adjustment comprising a clamp arm of flexible material having an opening adjacent each end thereof with each of said openings having a respective shaft disposed therein, said clamp arm being split longitudinally thereof between said openings to form a pair of spaced parallelly extending arm portions, a bearing plate disposed upon the surface of one of the arm portions, said bearing plate and adjacent arm portion having concentric openings therethrough, a connecting member extending freely through said openings and having one end fixedly secured to the other of said arm portions, said connecting member being secured to said bearing plate for rotating movement therewith and having a portion extending outwardly of said bearing plate, means for securing said bearing plate to the adjacent arm portion to prevent rotation of said bearing plate and connecting member, and a handle pivotally connected to the outwardly extending portion of said connecting member and having a portion bearing upon said bearing plate whereby upon pivotal movement of said handle to exert presure upon the bearing plate the arm portions will be flexed toward one another to tighten the ends thereof about said shafts and retain the adjustable members in adjusted position.

3. A head rest comprising the combination of a pair of adjustable members each having a shaft fixedly carried thereby, and a clamping device for immobilizing said members after adjustment comprising a clamp arm of flexible material having an opening adjacent each end thereof with each of said openings having a respective shaft disposed therein, said clamp arm being split longitudinally thereof between said openings to form a pair of spaced parallelly extending arm portions one of which has a substantially flat surface area formed approximately midway thereof with an opening provided substantially centrally thereof and extending through said arm portion toward the other of said arm portions, a bearing plate movably disposed upon said flat surface and having an opening therethrough concentric with the opening in said arm portion and further having a recess formed in its outer surface, a connecting member extending freely through said concentric openings and having one end fixedly secured to the opposed arm portion, said connecting member having a head portion extending outwardly from said bearing plate, said head portion being of a size and shape to fit within the recess in said bearing plate to connect the connecting member to the bearing plate for simultaneous rotation with one another, adjusting means for securing said bearing plate to the adjacent arm portion to retain the bearing plate in a longitudinal position with respect to the arm portions and to prevent rotation of said bearing plate and connecting member, said adjusting means being operable to move the adjacent end of the bearing plate toward or away from the adjacent arm portion to provide the desired tension in the device, and a handle pivotally connected to the outwardly extending head portion of said connecting member and extending in a direction substantially parallel to the arm portions when the bearing plate is secured to the adjacent arm portion by the adjusting means, said handle being movable only about an axis substantially parallel to the plane of the flat surface formed on the adjacent arm portion, said handle further having a portion operatively bearing upon said bearing plate whereby upon pivotal movement of said handle pressure may be exerted upon the bearing plate or removed therefrom to cause the arm portions to flex toward or away from one another in tightening and loosening the ends thereof about said shafts.

4. In a head rest having a pair of adjustable members each having a shaft fixedly connected thereto, a clamping device for immobilizing said members after adjustment comprising the combination of a clamp arm of flexible material having an opening adjacent each end thereof, each of said openings having a respective shaft disposed therein, said clamp arm being split longitudinally thereof between said openings to form a pair of spaced parallelly extending arm portions, a bearing plate disposed upon the surface of one of the arm portions, said bearing plate and adjacent arm portion having concentric openings therethrough, a connecting member extending freely through said opening and having one end fixedly secured to the other of said arm portions, said connecting member being secured to said bearing plate for rotating movement therewith and having a portion extending outwardly of said bearing plate, means for securing said bearing plate to the adjacent arm portion to prevent rotation of said bearing plate and connecting member, and a handle pivotally connected to the outwardly extending portion of said connecting member and having a portion bearing upon said bearing plate whereby upon pivotal movement of said handle to exert pressure upon the bearing plate the arm portions will be flexed toward one another to tighten the ends thereof about said shafts and retain the adjustable members in adjusted position.

5. In a head rest having a pair of adjustable members each having a shaft fixedly connected thereto, a clamping device for immobilizing said members after adjustment comprising the combination of a clamp arm of flexible material having an opening adjacent each end thereof, each of said openings having a respective shaft disposed therein, said clamp arm being split longitudinally thereof between said openings to form a pair of spaced parallelly extending arm portions one of which has a substantially flat surface area formed approximately midway thereof with an opening provided substantially centrally thereof and extending through said arm portion toward the other of said arm portions, a bearing plate movably disposed upon said flat surface and having an opening therethrough concentric with the opening in said arm portion and further having a recess formed in its outer surface, a connecting member extending freely through said concentric openings and having one end fixedly secured to the opposed arm portion, said connecting member having a head portion extending outwardly from said bearing plate, said head portion being of a size and shape to fit within the recess in said bearing plate to connect the connecting member to the bearing plate for simultaneous rotation with one another, adjusting means for securing said bearing plate to the adjacent arm portion to retain the bearing plate in a longitudinal position with respect to the arm portions and to prevent rotation of said bearing plate and connecting member, said adjusting means being operable to move the adjacent end of the bearing plate toward or away from the adjacent arm portion to provide the desired tension in the device, and a handle pivotally connected to the outwardly extending head portion of said connecting member and extending in a direction substantially parallel to the arm portions when the bearing plate is secured to the adjacent arm portion by the adjusting means, said handle being movable only about an axis substantially parallel to the plane of the flat surface formed on the adjacent arm portion, said handle further having a portion operatively bearing upon said bearing plate whereby upon pivotal movement of said handle pressure may be exerted upon the bearing plate or removed therefrom to cause the arm portions to flex toward or away from one another in tightening and loosening the ends thereof about said shafts.

6. An adjustable support for a head rest comprising a pair of members each having a pivot member fixedly carried thereby, a clamp arm having bearing portions adjacent its opposed ends in which the respective pivot members are extended, said clamp arm having a slot extending longitudinally thereof and communicating with the respective bearing portions so as to produce spaced intermediate portions with one of said portions being movable toward the other, said movable portion having an opening therethrough and an engageable portion adjacent said opening, a connecting member extending freely through said opening and secured to the other intermediate portion, and a clamp member pivotally carried by the free end of said connecting member and having a handle portion extending longitudinally of the spaced intermediate portions which when moved in one direction will cause said clamp member to engage said engageable portion so as to move one of said intermediate portions toward the other to cause said respective bearing portions to frictionally grip the pivot members and when moved in the opposite direction will release said frictional grip of said bearings, said engageable portion of the moveable intermediate portion and free end of the connecting member having interengaging means whereby said clamp member and handle portion may be held against sidewise displacement during the movement thereof about the pivot.

7. An adjustable support for a head rest comprising a pair of members each having a pin-like pivot member carried thereby, a clamp arm having bearing portions adjacent its opposed ends through which the respective pivot members are extended, said clamp arm having a slot extending longitudinally thereof and communicating with the respective bearing portions so as to produce spaced intermediate portions with one of said portions being movable toward the other and having an opening therethrough, a connecting member extending freely through said opening and having a portion adjustably secured to the other of said intermediate portions, said intermediate portion having an engageable portion adjacent said opening therein, and a clamp member pivotally carried by the free end of said connecting member and having a portion to engage said engageable portion of the intermediate portion having the opening therein, said clamp member further having a handle portion extending longitudinally of the spaced intermediate portions which when moved in one direction will cause said clamp member to move the adjacent intermediate portion toward the other thereof to cause said respective bearing portions to frictionally grip the pivot members and when moved in the opposite direction will release said frictional grip of said bearings, said engageable portions having a recess therein adjacent said opening, and said free end of the connection member being shaped to fit therein so as to be held against sidewise displacement during the movement of the handle portion and clamp member about the pivot.

8. An adjustable support of the character described comprising a pair of arms, one having a pivot member carried adjacent one end, and the other arm having a bearing portion adjacent one end and through which the pivot member is extended, said other arm having a slot extending longitudinally thereof from points intermediate its opposed ends and communicating with the bearing portion thereof so as to produce spaced intermediate portions with one of said portions being movable toward the other and having an opening therethrough intermediate the ends of said slot, a connecting member extending freely through said opening and having a portion adjustably secured to the other of said intermediate portions, a bearing plate located over the free end of said connecting member and movable therewith, a clamp member pivotally carried by the free end of said connecting member and having a portion engaging the bearing plate, said clamp member further having a handle portion extending longitudinally of the spaced intermediate portions which when moved in one direction will cause said clamp member to bear upon the bearing plate to move the adjacent intermediate portion toward the other thereof to cause said bearing portion to frictionally grip the pivot member of the first arm and when moved in the opposite direction will release said frictional grip of the bearing portion, and adjusting means for adjustably positioning the bearing plate against the adjacent intermediate portion and holding said clamp member and handle portion against sidewise displacement during the movement thereof about the pivot.

9. An adjustable support of the character described comprising the combination of a pair of arms, one having a pivot member fixedly carried thereby, and the other arm being of flexible material and having an opening adjacent one end thereof with the pivot member of the first arm disposed therein, said other arm being slotted longitudinally thereof intermediate its ends and communicating with said opening to form a pair of spaced parallelly extending arm portions, a bearing plate disposed upon the surface of one of the arm portions, said bearing plate and adjacent arm portion having concentric openings therethrough, said opening in the adjacent arm portion being intermediate the ends of said slot, a connecting member extending freely through said openings and having one end fixedly secured to the other of said arm portions, said connecting member being secured to said bearing plate for rotating movement therewith and having a portion extending outwardly of said bearing plate, means for securing said bearing plate to the adjacent arm portion to prevent rotation of said bearing plate and connecting member, and a handle pivotally connected to the outwardly extending portion of said connecting member and having a portion bearing upon said bearing plate whereby upon pivotal movement of said handle to exert pressure upon the bearing plate the arm portions will be flexed toward one another to tighten the end thereof about said pivot member of the first arm and retain the two arms in adjusted position.

HENRY B. COLE.

REFERENCES CITED

The following references are of record in the file of this patent:

UNITED STATES PATENTS

| Number | Name | Date |
|---|---|---|
| 974,188 | Ritter | Nov. 1, 1910 |
| 1,728,025 | Weber | Sept. 10, 1929 |